(12) United States Patent
Nakano

(10) Patent No.: US 7,513,034 B2
(45) Date of Patent: Apr. 7, 2009

(54) RIM DISK ASSEMBLING DEVICE FOR FULL FACE WHEEL FOR VEHICLE

(75) Inventor: Hiroyuki Nakano, Anjo (JP)

(73) Assignee: Central Motor Wheel Co., Ltd., Aichi (JP)

( * ) Notice: Subject to any disclaimer, the term of this patent is extended or adjusted under 35 U.S.C. 154(b) by 324 days.

(21) Appl. No.: 10/596,233

(22) PCT Filed: Dec. 26, 2003

(86) PCT No.: PCT/JP03/16927

§ 371 (c)(1),
(2), (4) Date: Jun. 5, 2006

(87) PCT Pub. No.: WO2005/065969

PCT Pub. Date: Jul. 21, 2005

(65) Prior Publication Data

US 2007/0062039 A1 Mar. 22, 2007

(51) Int. Cl.
*B23P 19/00* (2006.01)

(52) U.S. Cl. .................................... 29/802; 29/894.322

(58) Field of Classification Search ............ 29/894.321, 29/894.322, 464, 468, 469, 33 K, 559, 271, 29/281.1, 281.4, 281.5, 802
See application file for complete search history.

(56) References Cited

U.S. PATENT DOCUMENTS 3,725,992 A 4/1973 Davis
4,173,817 A * 11/1979 Voglrieder et al. ............ 483/14
6,513,241 B1 * 2/2003 Shalosky ................ 29/894.322
6,547,123 B2 * 4/2003 Kemmerer ................... 228/212

FOREIGN PATENT DOCUMENTS

| JP | 47-7081 B1 | | 2/1972 |
| JP | 3-40030 U | | 4/1991 |
| JP | 03285799 A | * | 12/1991 |
| JP | 4-304931 A | | 10/1992 |

OTHER PUBLICATIONS

English language translation of JP03285799A Dec. 16, 1991.*
International Search Report for PCT/JP2003/016927 mailed Apr. 20, 2004.

* cited by examiner

*Primary Examiner*—David P Bryant
*Assistant Examiner*—Ryan J Walters
(74) *Attorney, Agent, or Firm*—Darby & Darby P.C.

(57) ABSTRACT

A mounting device for a rim disk of a full face wheel for a vehicle has a disk disposed on a rotating table rotated by a rotating device about the center axis (X) of a full face wheel and radially positioned by a hub hole fitting piece and a rim disposed on the disk and radially positioned by arresting a rim drop part by a rim position arresting means, with the disk and rim being pressingly held between a disk support piece and a rim support piece by upwardly pulling an aligning rod connected to the rotating table through a rod connection means along the center axis (X) of the full face wheel while downwardly pressing a rim flange part by the rim support piece to bring the disk and the rim into a pressed state. By the rim disk mounting device, the disk and the rim radially positioned with high accuracy can be brought into pressed state with a strong holding pressure, and both the disk and the rim can be stably rotated. Thus, a thermal deformation can be suppressed and welding can be uniformly and accurately performed.

9 Claims, 8 Drawing Sheets

RIM DISK ASSEMBLING DEVICE FOR FULL FACE WHEEL FOR VEHICLE

CROSS-REFERENCE TO PRIOR APPLICATION

This is a U.S. National Phase Application under 35 U.S.C. §371 of International Patent Application No. PCT/JP2003/016927, filed Dec. 26, 2003, which is incorporated by reference herein. The International Application was published in Japanese on Jul. 21, 2005as International Publication No. WO 2005/065969 under PCT Article 21(2).

TECHNICAL FIELD

The present invention relates to a device for assembling an article and in particular, to a rim disk assembling device for use in the manufacture of full face wheels for vehicles to put together a disk and a rim at the time of welding.

BACKGROUND

The full face wheel for vehicles is made up of a disk and a rim. The disk has a circumferential disk flange for holding the tire bead from its side. The rim has, at its one end opening, a joint opening circumferential end to be joined by welding to the back face of the disk and, at its other end opening, a rim flange portion. Here, it is a common practice to join the disk and the rim, in the state of the joint opening circumferential end of the rim made into contact with a specified position on the back face of the disk, by fillet welding from outside along the circumferential direction.

When the disk and the rim are joined by welding, they must be radially positioned so that their radial centers are in agreement with each other, and high accuracy is required in the radial positioning. If the radial positioning accuracy were low, anti-wobble accuracy of the welded full face wheel would be low, which could result in that the vehicle provided with such wheels cannot exhibit desired driving performance. The disk and the rim are also required to be joined by welding in the state of both components being put together and pressed against each other with relatively great forces. This is to restrict thermal deformation due to weld heat produced during welding and to prevent the anti-wobble accuracy from lowering due to the thermal deformation by pressing together the disk and the rim.

A rim disk assembling device, that makes it possible to radially position the disk and the rim with high accuracy and restrict the thermal deformation, as described above, is described in the Patent Document JP-B-2793001. This rim disk assembling device has a structure in which the hub hole of a disk is fit over a hub hole guide provided on a rotary table, and a rim clamp, capable of contacting the rim as guided with a centering pole provided in the center of the hub hole guide, is pressed against the rim placed on the disk.

The hub hole is fit over the hub hole guide to radially position the disk. Further, by pressing the rim clamp against the rim, to bring the disk and the rim placed on the rotary table into pressed contact state and, at the same time, the outside round taper surface of the rim clamp with its wedge effect radially positions the rim. In this way, it is possible to radially position the rim and the disk with high accuracy and bring the both components into pressed contact state.

With respect to the above described rim disk assembling device, the pressing force for bringing the disk and the rim into pressed contact state becomes a direct load onto the rotary table rotated at the time of welding. In order that the load may not work on the driving motor, transmission members, such as gears, are interposed between the rotary table and the driving motor for rotating the rotary table, and the rotary shaft of the driving motor and the rotary shaft of the rotary table are not disposed on the same axis. As for the transmission member, such as gears, it is a common practice to provide small clearance, the so-called backlash, between meshing gears to transmit rotation smoothly. However, due to this backlash, the rotation of the driving motor is not transmitted accurately to the rotary table at the times of start and stop of rotation. As a result, it is hard to rotate the disk and the rim in a stabilized manner at the time of welding, which causes a limit to stabilizing the weld quality.

Moreover, the pressing force for bringing the disk and the rim into pressed contact state is also applied directly to the bearings and the like supporting the rotary table. As a result, local stress concentration occurs on the bearings due to errors occurring inherently in the manufacture of the disk and the rim. The stress concentration could lower strength and durability of the rotary table and the bearings. Moreover, to alleviate such a problem, the magnitude of the pressing force for bringing the disk and the rim into pressed contact state must be limited. As a result, welding cannot be made under a satisfactorily pressed contact state. Therefore, there is a limit to restricting thermal deformation occurring during welding.

SUMMARY

An object of the present invention is to provide a rim disk assembling device for a vehicle full face wheel that makes it possible to solve the above problems, to radially position the disk and the rim with high accuracy, and to restrict sufficiently the thermal deformation occurring during welding.

According to one embodiment of the present invention, a rim disk assembling device for a vehicle full face wheel includes a centering rod moving up and down along a center axis of a full face wheel and a rotary table rotated about the center axis by a rotating means. The device has a hub hole fitting member disposed on the rotary table to radially position a disk by fitting to the hub hole of the disk and also includes a disk supporting member disposed on the rotary table to support the disk from the designed surface side of the area joined to a rim. A rim supporting member moves down along the center axis together with the centering rod to support the rim disposed on the disk supported with the hub hole supporting member and the disk supporting member by pressing from above its rim flange portion. The system includes a rim position restraining means that radially positions the rim by radially restraining the inside circumferential surface of a rim drop portion as centered on the centering rod.

A rod connecting means is configured for connecting the centering rod that has moved down along the center axis to the rotary table. The present device is adapted to bring into a pressed contact state the disk radially positioned with the hub hole fitting member and the rim radially positioned with the rim position restraining means by sandwiching them between the disk supporting member and the rim supporting member and by pulling up the centering rod connected through the rod connecting means to the rotary table while pressing down the rim flange portion with the rim supporting member.

The above arrangement is to bring the radially positioned disk and rim into pressed contact state by the downward press with the rim supporting member and by the upward pull with the disk supporting member. In this way, the downward pressing force (hereinafter called the pressing force) and the upward pulling force (hereinafter called the pulling force) work as forces for sandwiching the disk and the rim (hereinafter called the sandwiching forces) so as to prevent a heavy load from working on the rotating means for rotating the rotary table. Here, making the pulling force greater than the pressing force results in that the load does not work directly on the rotating means. Further, making the pressing force and the pulling force about the same amount results in that almost all of the resultant force of those forces is used for sandwiching, so that the load is prevented from working on areas other than the working areas where the disk and the rim are sandwiched.

Therefore, this rotating means is capable of rotating the rotary table stably and suitably even when the disk and the rim are in a pressed contact state. Besides, since no heavy load works on the rotating means while the disk and the rim are sandwiched, the pressing force and the pulling force may be made to work heavily so as to bring the rim and the disk into a pressed contact state to sufficiently restrict thermal deformation occurring during welding. This makes it possible to improve and stabilize weld quality of the disk and the rim. As a result, it is possible to manufacture the full face wheels for vehicles with higher anti-wobble accuracy, that exhibit lower vibration and lower noise characteristics in comparison with the rim disk assembling device of the conventional arrangement described above.

Further, since no load works on the supporting member supporting the rotary table from under, stresses are prevented from locally concentrating on the supporting member, so that rotation may be maintained stably and suitably even if a large number of assembly processes are carried out.

According to the present invention, the radial position of the rim is determined by restraining the rim drop portion using the rim position restraining means. Here, the rim drop portion is the portion formed generally with the highest accuracy. Therefore, this rim disk assembling device is capable of radially positioning the rim with high accuracy.

On the other hand, according to the invention, the disk supporting member and the rim supporting member are disposed generally vertically directly above and below the joint area of the disk and the rim. In this way, the sandwiching forces for sandwiching the disk and the rim work directly on the joint area, so that pressed contact state between both the components is produced efficiently. Moreover, since the rim position restraining means radially restrains the rim drop portion, the rim drop portion is restricted from bend-deforming radially by the sandwiching forces of the disk and the rim. As a result, the sandwiching forces work suitably to press together the disk and the rim even if the pressing force and the pulling force are increased, thereby making it possible to create a firmly pressed contact state.

Also with the rim disk assembling device for a vehicle full face wheel as described above, an arrangement is proposed in which the rod connecting means includes: a clamp portion formed at the tip of the centering rod; a rod insertion hole formed in the center of the rotary table for the centering rod to be inserted into; and a rod gripping device disposed on the underside of the rotary table to grip and fix the clamp portion of the centering rod inserted into the rod insertion hole and projecting from the underside and to bring the rotary table and the centering rod into connected state in which they can move as a single body.

In the above arrangement, as the rod gripping device brings the centering rod and the rotary table into connected state, the rotary table may be pulled along the center axis to move up parallel along with the pulling action of the centering rod. Therefore, it is possible to pull up the disk supporting member evenly over the circumference and to sandwich the disk and the rim equally over the circumference. The rod gripping device is capable of producing the pressed contact state of the disk and the rim relatively easily and suitably. Here, the rod gripping device is preferably constituted to grip the clamp portion of the centering rod in plural directions, at two radially opposite positions, or three positions equally spaced over the circumference, etc.

Also with the rim disk assembling device for a vehicle full face wheel as described above, an arrangement according to one embodiment includes a vertical motion rotary unit on which a rod pulling device for pulling the centering rod into action, a rim supporting member, and a rim position restraining means are mounted; and a vertical motion frame to which the vertical motion rotary unit is connected to be rotatable and making vertical action like a single body, and connected to a vertical driving device for drive-causing the vertical action, in which the vertical motion rotary unit rotates like a single body with the rotary table when the disk and the rim are brought into sandwich-pressed contact state by setting the rotary table connected to the centering rod into pulling action by means of the rod pulling device.

The above arrangement is to make it possible to cause the vertical motion rotary unit to make vertical action like a single body by the drive of the vertical driving device and when brought into the pressed contact state to rotate the vertical motion rotary unit like a single body together with the rotary table relative to the vertical motion frame by the rotating means. Further it is possible to set the centering rod into pulling action by the rod pulling device independently of the vertical action caused with the vertical driving device. In other words, it is possible with relatively easy and simple arrangement, as described above, to bring the disk and the rim into pressed contact state by strong sandwiching forces with high accuracy and to suitably exhibit the function and effect of the invention for stably rotating the disk and the rim. Thus, it is possible to improve and stabilize the weld quality of the vehicle full face wheel.

With the above rim disk assembling device for a vehicle full face wheel, an arrangement is provided in which the vertical motion rotary unit has: a rim supporting member and a rim position restraining means mounted both on its underside; a rod pulling device disposed in its upper part; and a vertical motion table with a rod passage hole formed in its center for a centering rod to be inserted into to be vertically movable. The above arrangement is the one in which the vertical motion table or the above-described vertical motion rotary unit is disposed as a core; and the rim supporting member, the rim position restraining means, the centering rod, and the rod pulling device are suitably disposed on the vertical motion table. This makes it possible with the vertical motion rotary unit as a whole to perform accurately and easily the above described vertical action by the drive with the vertical driving device and the rotary action like a single body together with the rotary table. Therefore, it is possible, as described above, to exhibit more suitably the function and effect of the invention, bringing the disk and the rim into pressed contact state with high accuracy and rotating them stably.

Here, an arrangement is proposed in which the rim position restraining means includes: a plural number of radial restraining members disposed in the vertical motion table at about constant angular intervals around the centering rod, each made up of a holding case, suspended from a vertical motion table, urged downward, and vertically movable; and a pressing member installed in the holding case, radially movable, urged radially inward, with its inside end having a pressed portion, and with its outside end having a contacting portion for contacting the inside circumferential surface of the rim drop portion; and a conversion guide member suspended from the vertical motion table to contact the pressed portions of the pressing members along with the downward motion of the vertical motion table, to cause the pressing members to extend radially outward, and to cause the contacting portions of the pressing members to press against the inside circumferential surface of the rim drop portion in the state in which the rim supporting member contacts the rim flange portion from above.

This arrangement is to change the downward motion of the vertical motion table into radially expanding action of the pressing member disposed on the radial restraining members by means of the conversion guide member. Disposing the plural number of radial restraining members at about constant angular intervals on the circumference makes it possible to restrain the rim drop portion evenly along the circumference so as to radially position the rim with high accuracy. Since the rim drop portion is restrained in the state in which the rim supporting member contacts the rim flange portion from above, the rim and the disk radially positioned with high accuracy are suitably sandwiched together. On the other hand, as the vertical motion table moves up and the conversion guide member moves up relative to the radial restraining member, the pressing members having radially expanded are retracted by radially inward urging forces. This comes to the release of restraint on the rim drop portion. Thus the arrangement radially positions the rim with high accuracy and maintains the state until the welding of the rim and the disk is over, so that improvement and stability in weld quality are further enhanced. The rim position restraining device is made with a relatively simple mechanism, so that its action is stable. Maintenance and replacement are also easy, with excellent advantage that their costs can be reduced.

On the other hand, an arrangement is proposed in which the rotating means is a rotating device with a rotary shaft disposed under the rotary table along the center axis to rotate the rotary table. In this arrangement, the rotation center of the rotary table and the rotary shaft of the rotating device may be placed on the center axis, so that the rotating device directly rotates the rotary table, without a speed reduction mechanism or gears interposed between the rotating device and the rotary table. This arrangement is easily made possible by the invention as described above in which no strong load works on the lower part of the rotary table when the disk and the rim are sandwiched together. This arrangement permits stabilized rotation of the rotary table about the center axis. Further, no backlash inherent in the speed reduction mechanism or gears is present, so that the rotation of the rotary table is optimized even at start point or stop point of rotation. Therefore, it is possible to weld the disk and the rim in the pressed contact state further evenly along the circumferential direction, so that weld quality is further improved.

According to another aspect, an arrangement is provided in which the rotating device is a direct drive motor. The direct drive motor can produce continuously large torque and its rotation can be controlled with high accuracy because the current to torque characteristic is linear. As the direct drive motor directly rotates the rotary table, it is possible to further stabilize the rotation of the disk and the rim brought into pressed contact state with strong squeezing forces. As the rotation is controlled with high accuracy even at start point and stop point of rotation, it is possible to stabilize and make smooth the rotation of the rotary table from start to stop of rotation.

BRIEF DESCRIPTION OF THE DRAWING FIGURES

The foregoing and other features of the present invention will be more readily apparent from the following detailed description and drawings of illustrative embodiments of the invention in which.

DETAILED DESCRIPTION OF PREFERRED EMBODIMENTS

Figure 1:
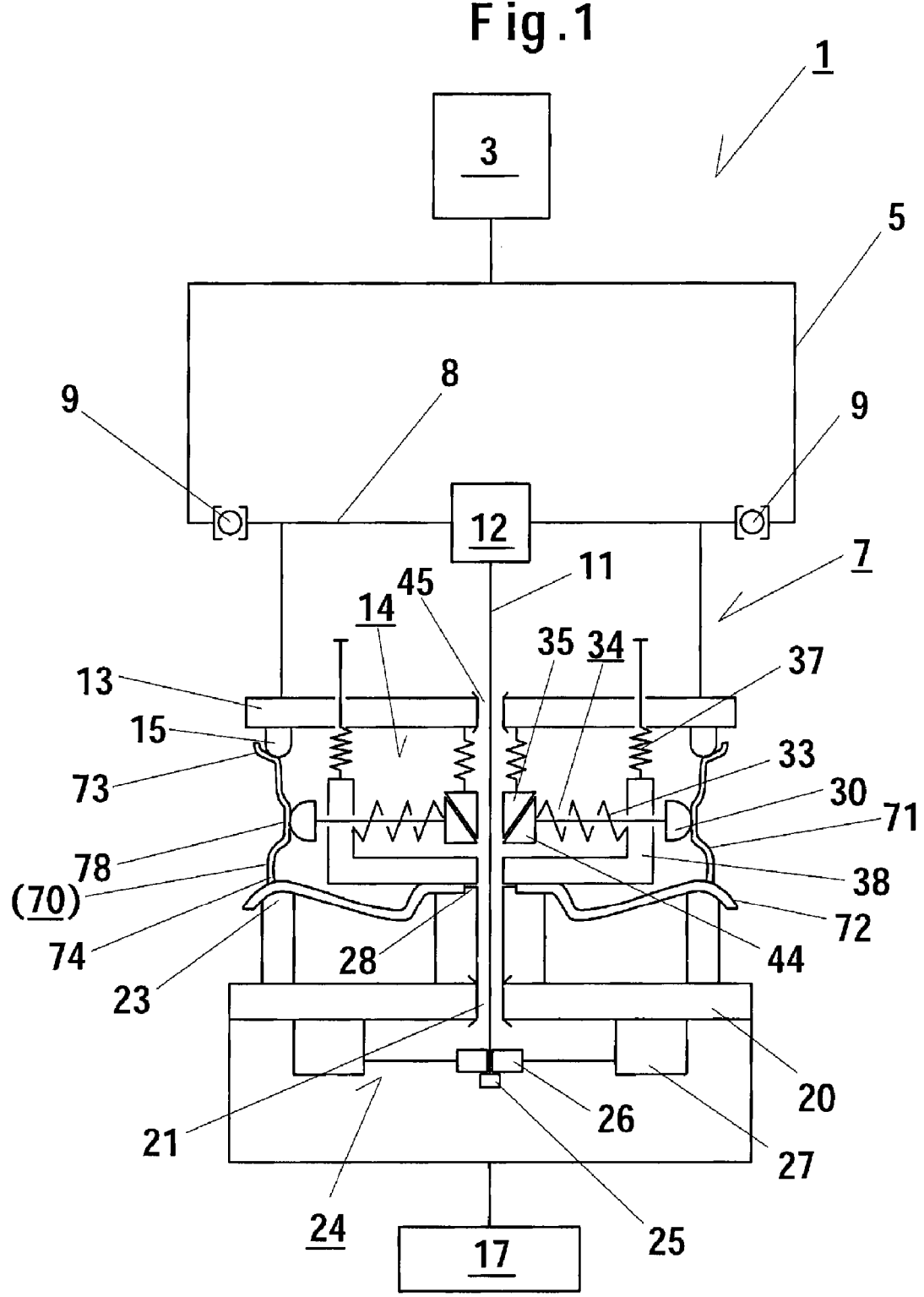
FIG. 1 is a schematic view of a rim disk assembling device for a vehicle full face wheel according to one embodiment of the present invention.

A schematic of a rim disk assembling device 1 for the vehicle full face wheel according to one embodiment of present invention is shown in FIG. 1. The rim disk assembling device 1 for use in assembling a vehicle full face wheel is shown as an embodiment in FIGS. 2 to 4.

Figure 8:
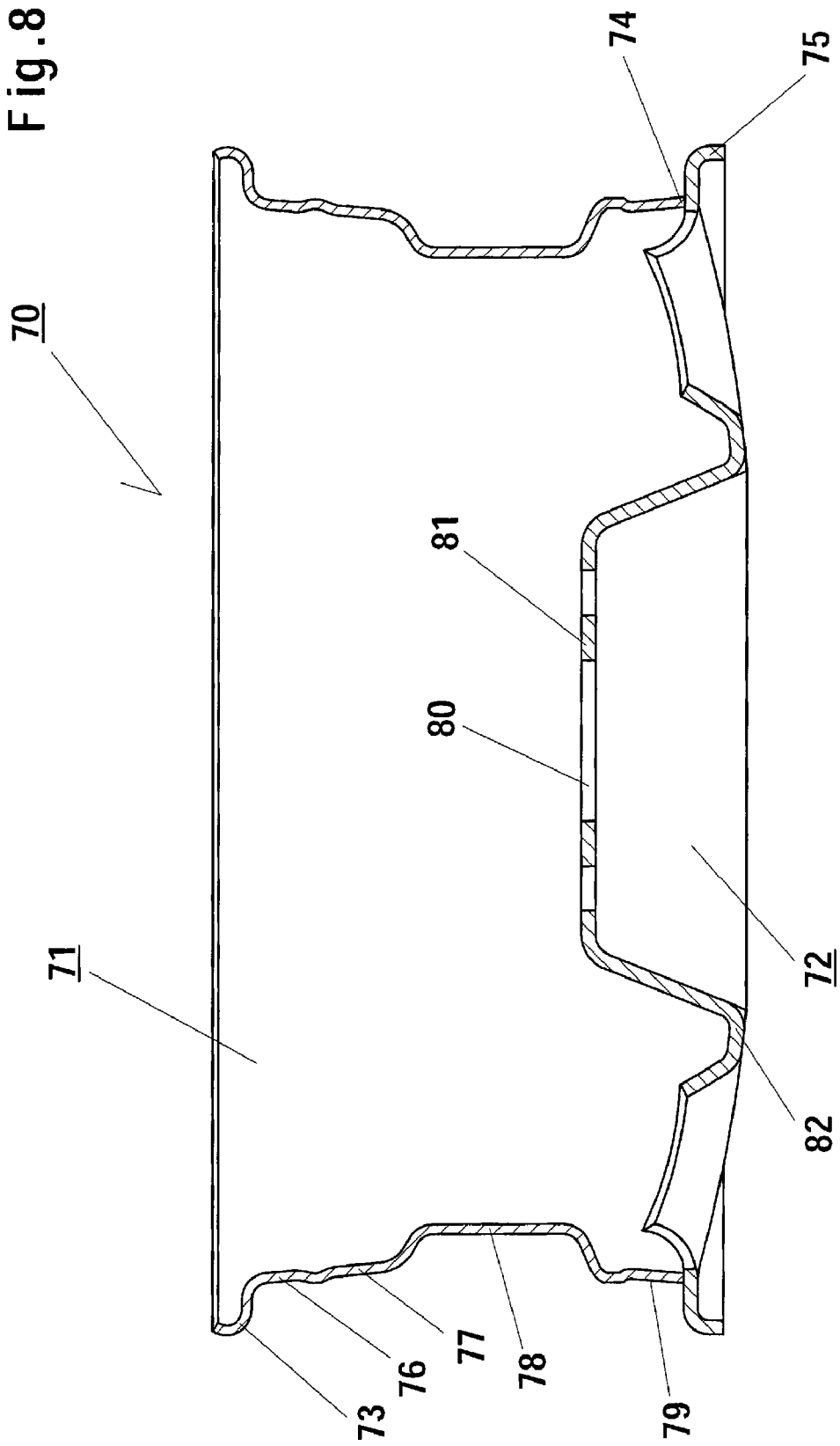
FIG. 8 is a vertical sectional view of a vehicle full face wheel.

The rim disk assembling device 1 for the vehicle full face wheel makes it possible to manufacture, for example, the vehicle full face wheel 70 shown in FIG. 8 by putting together and welding the disk 72 and the rim 71. The rim 71 has a rim flange portion 73 formed on its one circumferential opening end and a joint opening circumferential end 74 on the other circumferential opening end. The disk 72 has a disk flange portion 75 formed on its outside circumference. The full face wheel 70 is made as a single body by fillet welding the joint opening circumferential end 74 of the rim 71 to the back side of the disk 72. Here in this embodiment, arc welding is used for the fillet welding. It is also possible for the fillet welding to use other known welding techniques, such as laser welding.

The rim 71 has the rim flange portion 73 at the circumferential opening edge that is open on the back side in the wheel axis direction for holding one tire bead from its side, continuing, in the wheel axis direction toward the designed surface, to a bead seat portion 76 for seating the tire bead. Further, as continued from the bead seat portion 76, a ledge portion 77 is formed on which is continuously formed a rim drop portion 78 for the tire bead to drop in when attaching the tire. On the other hand, the above-mentioned joint opening circumferential edge 74 is formed on the opening circumferential edge on the designed surface side in the wheel axis direction. Another bead seat portion 79 for seating the other bead of the tire is formed on the back side in the wheel axis direction. The bead seat portion 79 is formed continuous to the rim drop portion 78. Incidentally, the back side of the vehicle full face wheel 70 in the wheel axis direction denotes the side opposite the designed surface side of the disk 72.

On the other hand, the disk 72 has in its center a hub hole 80, with a hub attachment portion 81 formed on the radially outer side of the hub hole 80, and with the hub attachment portion 81 jointed to a vehicle hub on its back side. The hub attachment portion 81 is provided with bolt holes (not shown). A swell portion 82 is formed to swell outward from the radially outer side of the hub attachment portion 81. Plural number of decorative holes (not shown) are provided at constant circumferential intervals on the sloped surface sloping radially outward from the swell portion 82. Further, a disk flange portion 75 is formed on the periphery of the disk 72.

Next, the rim disk assembling device 1 for the vehicle full face wheel is described. The following explanation refers to FIG. 1, which is illustrative of the rim disk assembling device 1, of the invention.

Figure 2:
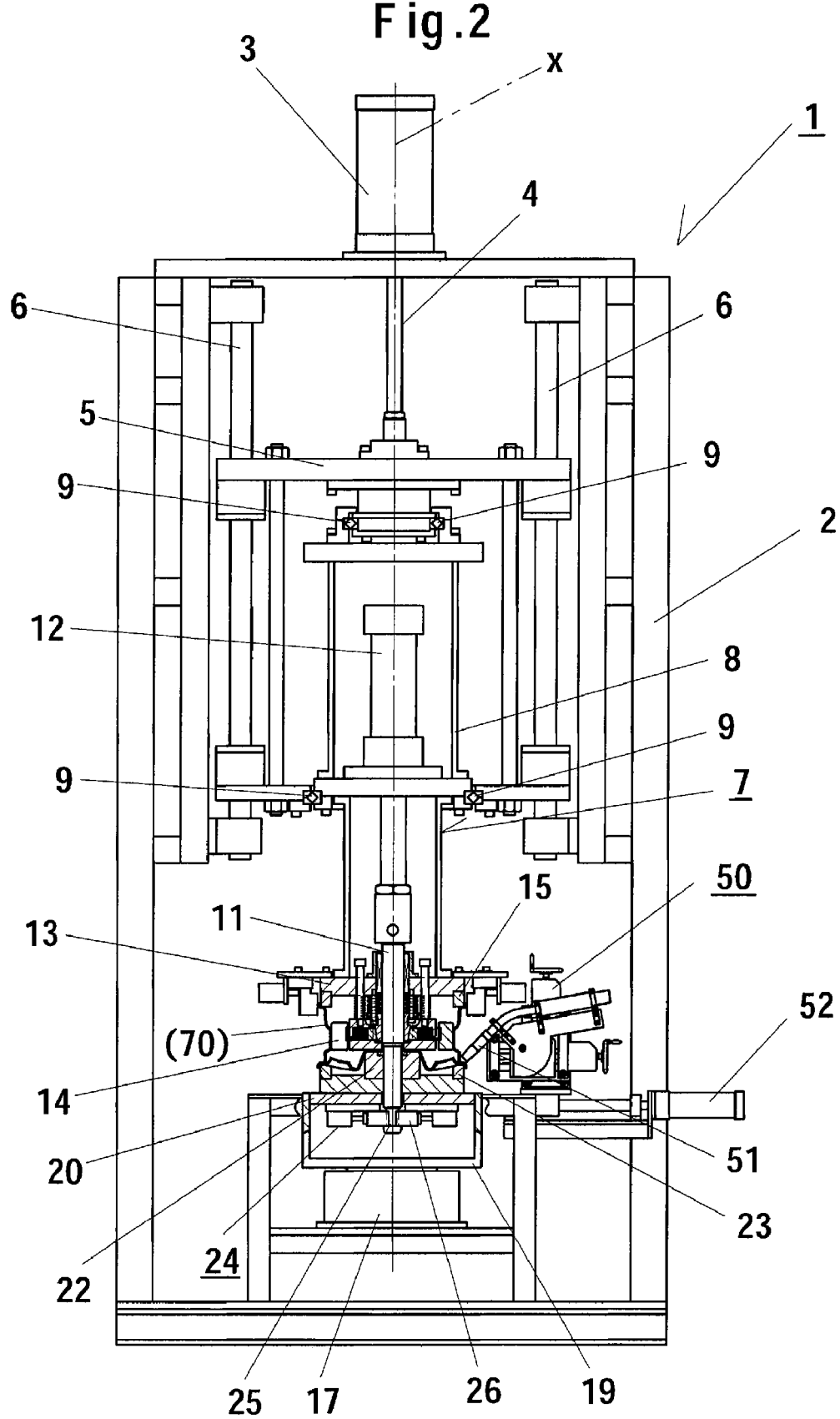
FIG. 2 is a front view of the rim disk assembling device of FIG. 1.

The rim disk assembling device 1 for the vehicle full face wheel is wholly supported on a base frame 2 as shown in FIG. 2. A vertical driving device 3 of an air cylinder type is disposed over the base frame 2. The vertical driving device 3 is connected to a vertical motion frame 5 through a vertical motion shaft 4 for vertical drive. The vertical motion frame 5 is guided with guide rails 6, 6 provided vertically in the base frame 2 to move up and down along the center axis X of the full face wheel. The vertical motion frame 5 is connected through cross roller bearings 9 to a vertical motion rotary frame 8. The vertical motion rotary frame 8 is adapted to be rotatable relative to the vertical motion frame 5 and also movable up and down together with the vertical motion frame 5 like a single body.

Here, a rod pulling device 12 of a hydraulic cylinder type is installed in the vertical motion rotary frame 8. The rod pulling device 12 pulls into action a centering rod 11 extending downward along the center axis X of the full face wheel. In other words, the centering rod 11 is pulled singly into action separately from other components such as a vertical motion rotary unit 7 and the vertical motion frame 5. The centering rod 11 is driven with the vertical driving device 3 to move up and down together with the vertical motion rotary frame 8 like a single body along the center axis X. The tip of the centering rod 11 is formed to be a clamp portion 25 to be gripped with a rod connecting device 24 (See FIG. 3) to be described later.

Figure 3:
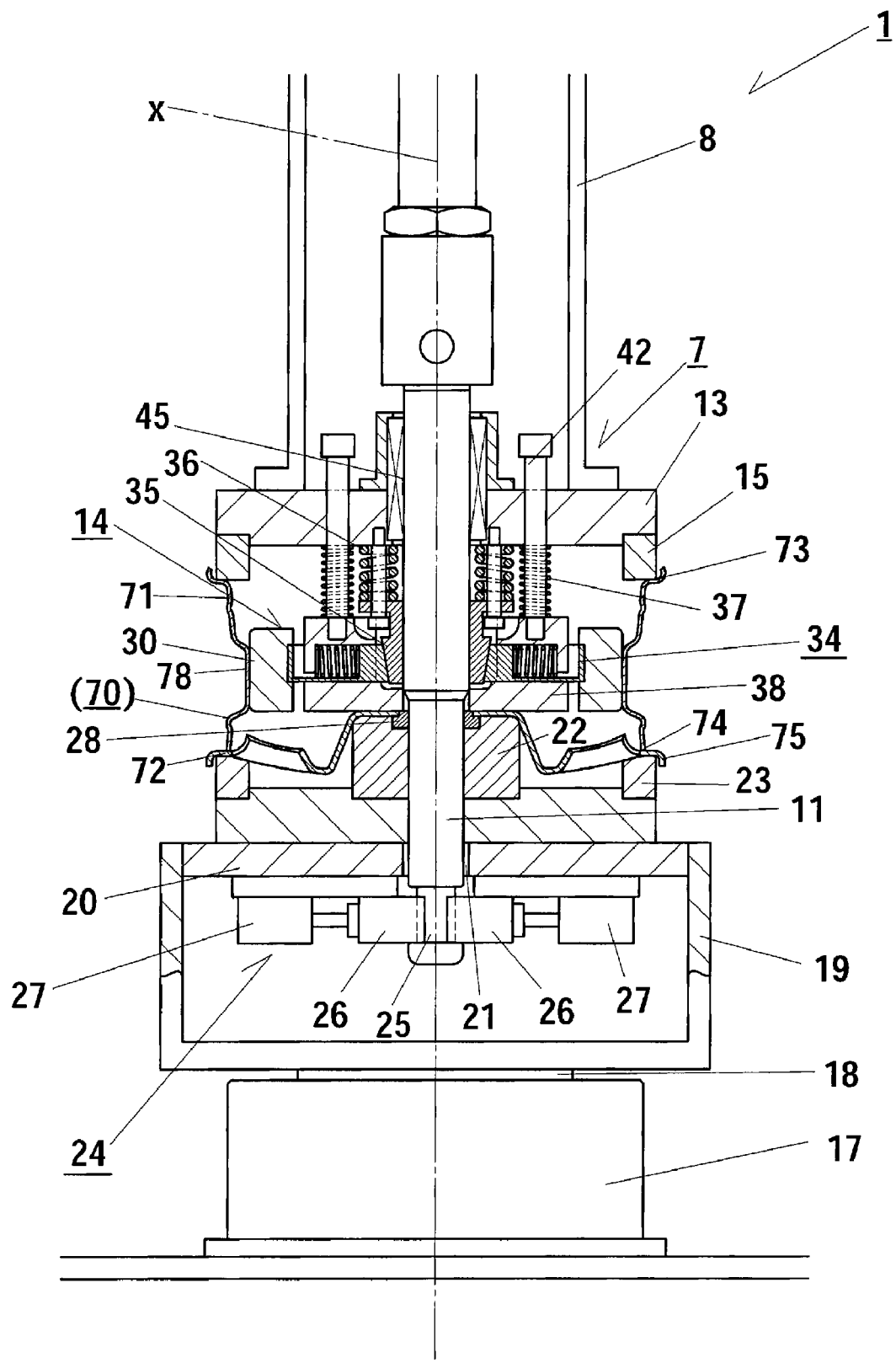
FIG. 3 is an enlarged sectional view of a part, for squeezing together a disk and a rim, of the rim disk assembling device of FIG. 1.

Further, a vertical motion table 13 is attached to the underside of the vertical motion rotary frame 8. The vertical motion table 13 as shown in FIG. 3 is provided with a rod passage hole 45 in its center for passing the centering rod 11 in vertical direction, so that the centering rod 11 may be movable up and down within the rod passage hole 45. On the underside of the vertical motion table 13, four radial restraining members 14 and a conversion guide member 35 are provided. Further, a rim supporting member 15 is provided to support from above the rim flange portion 73 of the rim 71. The rim supporting member 15 is of an annular shape about the center axis X to support the rim flange portion 73 evenly over its circumference. The vertical motion rotary unit 7 is made up of: the vertical motion rotary frame 8, the rod pulling device 12 provided in the vertical motion rotary frame 8, the vertical motion table 13, the radial restraining members 14 attached to the vertical motion table 13, the conversion guide member 35, and the rim supporting member 15.

In the lower part of the base frame 2, as shown in FIGS. 2 and 3, a direct drive motor 17 is disposed so that its rotary shaft 18 is coaxial with the center axis X. The rotary shaft 18 is connected through a rotary frame 19 to a rotary table 20, so that the direct drive motor 17 directly drives the rotary table 20. In this way, since the rotary table 20 is directly connected to the direct drive motor 17, it has an advantage of being free from backlash between gears. Further, since the direct drive motor 17 can produce great torque continuously and its rotation can be controlled with high accuracy, the rotary table 20 may be rotated stably from start to stop of the rotation.

The rotary table 20 is provided with a rod insertion hole 21 in its center as shown in FIG. 3 for the centering rod 11 to be inserted and moved up and down on the center axis X. The top surface of the rotary table 20 is provided with a hub hole fitting member 28 formed about the center axis X of the full face wheel to make it possible to radially position the disk 72 with high accuracy by fitting into the hub hole 80 of the disk 72. The hub hole fitting member 28 is disposed on a disk center supporting member 22 and formed also about the center axis X to support the hub attachment portion 81 of the disk 72 from the designed surface side as seen in the wheel axis direction. Here, the hub hole fitting member 28 and the disk center supporting member 22 are each provided with a hole (not shown) for the centering rod 11 to pass through. Thus, the centering rod 11 may pass from above the rotary table 20 downward through the hub hole fitting member 28, the disk center supporting member 22, and the rod insertion hole 21 of the rotary table 20.

Further on the top surface of the rotary table 20, a disk supporting member 23 is formed about the center axis X on the radially outer side of the disk center supporting member 22 along the circumferential direction of the wheel. The disk supporting member 23 is placed in a position for supporting, from the designed surface side as seen in the wheel axis direction, the area of the disk 72 to which the joint opening circumferential end 74 of the rim 71 is joined. The disk supporting member 23 and the rim supporting members 15 are provided in circumferential, over and under positions approximately opposite to each other. Thus, squeezing forces work directly on the joint area between the disk 72 and the joint circumferential opening 74 of the rim 71.

The rod connecting device 24 for gripping the clamp portion 25 of the centering rod 11 projecting down through the rod insertion hole 21 is provided on the underside of the rotary table 20 on the radially outer side of the rod insertion hole 21. The rod connecting device 24 is to grip on both sides of the clamp portion 25 of the centering rod 11 by extending gripping arms 26, 26 opposed to each other and capable of extending radially inward from outer retracted position. Thus, the rotary table 20 and the centering rod 11 are connected so that they move like a single body. Here, the rod connecting device 24 operates the gripping arms 26, 26 to extend/retract by means of air cylinders 27, 27.

On the other hand, as a rim position restraining means for radially positioning the rim 71, as shown in FIG. 3, four radial restraining members 14 are provided on the underside of the vertical motion table 13 as suspended at about constant circumferential angular intervals around the rod insertion hole 45. The radial restraining member 14 is made up of: a stripper bolt 42, a holding case 38 suspended from the vertical motion table 13 by means of a holding spring 37 wound around the stripper bolt 42 to urge the radial restraining member 14 downward, and a pressing member 34 fit to be radially movable in the holding case 38 (See FIG. 4). Here, the holding case 38 is vertically movable according to the movable length of the stripper bolt 42. That is to say, when the holding spring 37 is elastically compressed as pressed from under, the vertical distance between the holding case 38 and the vertical motion table 13 decreases. When the pressure from under is removed, the elastic compression is released and the vertical distance, which has decreased, increases.

Figure 4:
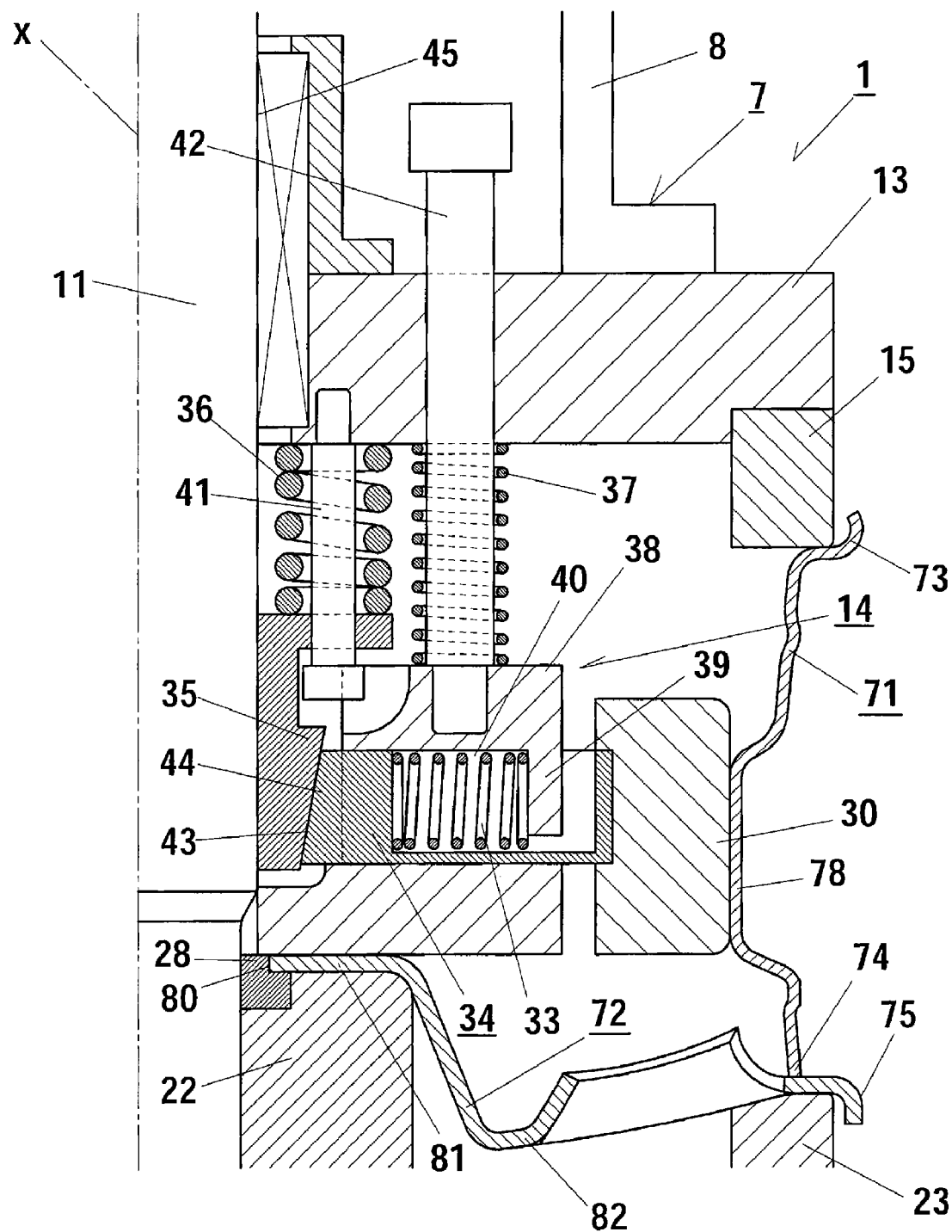
FIG. 4 is an enlarged sectional view of a conversion guide member and a radial restraining member.

Also here, as shown in FIG. 4, the pressing member 34 is installed in the holding case 38, so that it moves vertically together with the holding case 38. The pressing member 34 has a pressed portion 44 on its inside end and a contacting member 30 for contacting the inside circumferential surface of the rim drop portion 78 on its outside end. The pressed portion 44 has a sloped surface sloping up radially outward. Further, a spring groove 40 is formed between the pressed portion 44 and the contacting member 30, and a pressing spring 33 is placed in the spring groove 40 so that the spring 33 expands and contracts in the radial direction. The pressing spring 33 is supported on its radially inside end with the groove inside surface (not shown) and on its radially outside end with a spring engaging portion 39 formed to project from the holding case 38 into the spring groove 40. The pressing member 34 is urged with the pressing spring 33 radially inward in the holding case 38. When the pressing spring 33 is compressed with a radially outward pressure, the pressing member 34 moves radially outward. When the radially outward pressure is removed, the elastic compression is released and the pressing member 34 retracts radially inward.

Also as shown in FIGS. 3 and 4, a conversion guide member 35 is suspended from the underside of the vertical motion table 13 by means of a stripper bolt 41 and a guide spring 36 wound around the stripper bolt 41 to urge the conversion guide member 35 downward. The conversion guide member 35 is shaped with its outside having a guiding face 43 sloping up radially outward to be in contact with the pressed portion 44 of the pressing member 34. The conversion guide member 35 is disposed within the radial restraining member 14 and around the rod insertion hole 45 so that the guiding face 43 may contact the pressed portion 44. On the other hand, the conversion guide member 35 is suspended in a position that is higher than the radial restraining member 14. The conversion guide member 35, also like the holding case 38 described above, is adapted to be vertically movable according to the movable length of the stripper bolt 41. That is to say, the vertical distance to the vertical motion table 13 decreases with pressing force from under, and when the pressing force is removed, the vertical distance, which has decreased, increases.

Here, the guide spring 36 of the conversion guide member 35 is made to be harder to be elastically compressed by setting its spring constant higher than that of the holding spring 37 of the radial restraining member 14, so that the conversion guide member 35 is harder to move upward than the radial restraining member 14. In other words, when the vertical distance between the radial restraining member 14 and the vertical motion table 13 is shortened by a pressing force from under, the pressed portion 44 of the pressing member 34 contacts the guiding face 43. At this time, since the conversion guide member 35 is hard to move upward, the pressing member 34 moves radially outward along the slope angle of the pressed portion 44 and the guiding face 43, so that the distance between the radial restraining member 14 and the vertical motion table 13 decreases. On the other hand, when the pressing force from under is removed, the holding spring 37 elastically expands, the vertical distance between the radial restraining member 14 and the vertical motion table 13 increases, the guide spring 36 also expands elastically, and the pressing member 34 retracts radially inward. Incidentally in this embodiment, since the spring constant of the guide spring 36 is set considerably greater than that of the holding spring 37, the elastic compression amount of the guide spring 36 is very small.

As the radial restraining members 14 and the conversion guide member 35 are disposed using respectively the holding springs 37 and the guide springs 36, the pressing forces of the pressing members 34 restraining the inside circumferential surface of the rim drop portion 78 are moderated by the respective elastic compression and do not become great forces to deform the rim drop portion 78 radially outward.

As the pressing members 34 move outward as described above, the contacting members 30 are pressed against the inside circumferential surface of the rim drop portion 78 to restrain it. According to the present invention, as all the four radial restraining members 14 equally move the respective pressing members 34 outward to press the respective contacting members 30 against the inside circumferential surface of the rim drop portion 78, it is possible to radially restrain the rim drop portion 78 in a position in which the center of the rim 71 coincides with the center axis X. As described above, the rim 71 is radially positioned with high accuracy by the rim position restraining means of the invention constituted with the radial restraining members 14 and the conversion guide member 35.

In the rim disk assembling device 1 for the vehicle full face wheel of the invention described above, the respective components are provided along the center axis X of the full face wheel to carry out vertical motion along the center axis X and rotary and radial motions about the center axis X. Therefore, it is possible to radially position the disk 72 and the rim 71 with high accuracy with their axes coinciding with the center axis X and to bring them into pressed contact state with strong squeezing forces easily and stably.

On the other hand, the rim disk assembling device 1 for the vehicle full face wheel of the invention, as shown in the lower part of the base frame 2 of FIG. 2, is provided with a welding device 50 for fillet welding the disk 72 and the rim 71 brought into pressed contact state with the rim disk assembling device 1. The welding device 50 is disposed radially outside of the rotary table 20 to move a welding torch 51 radially back and forth by the back and forth drive of an air cylinder 52. It is controlled so that, when the rim 71 and the disk 72 come to a pressed contact state, the welding torch 51 is moved to an extended position to carry out arc welding synchronously with the rotation of the direct drive motor 17.

Next will be described the process of assembling and welding the vehicle full face wheel 70 by means of the above-described rim disk assembling device 1.

Figure 5:
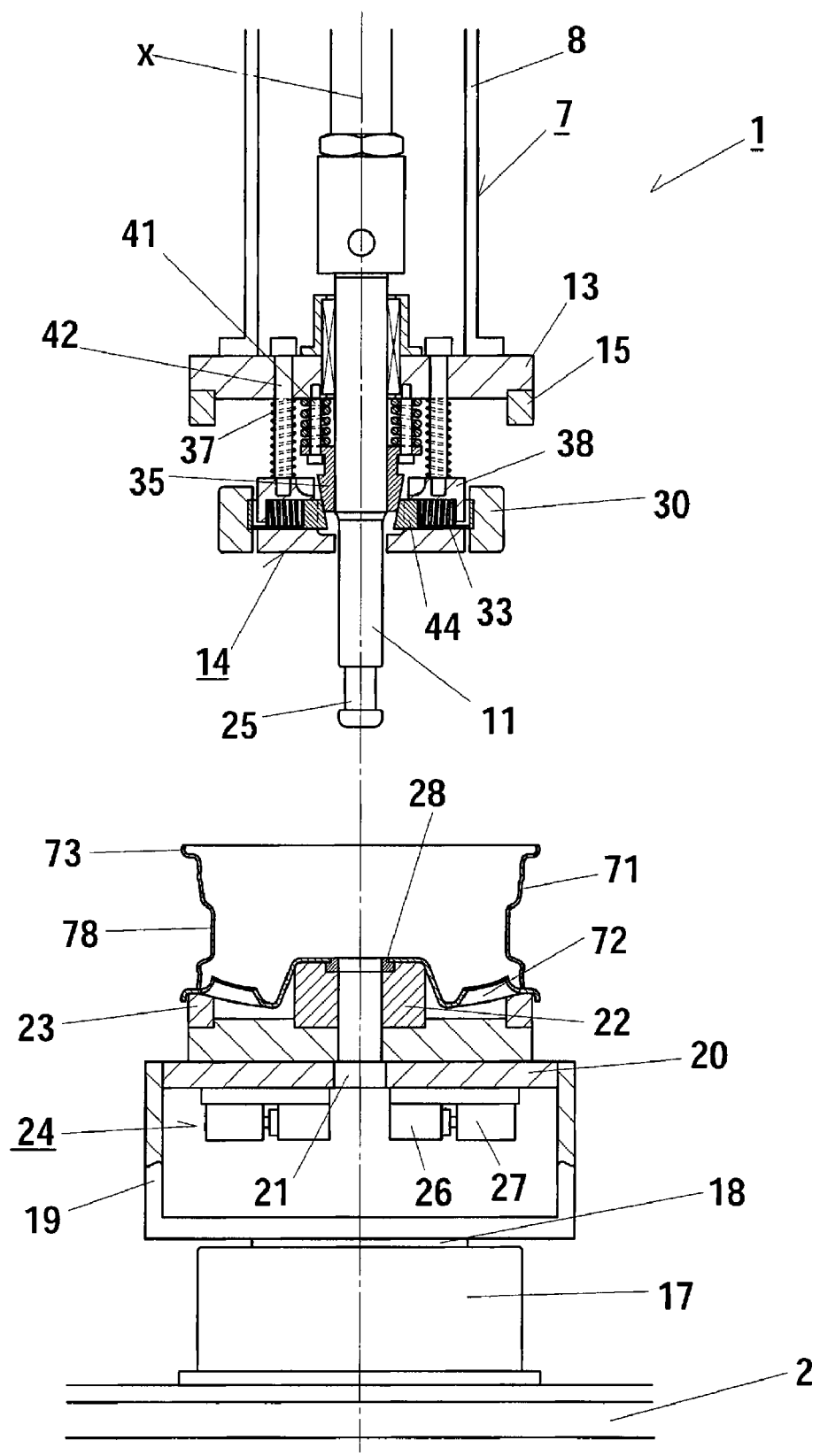
FIG. 5 is a partially exploded sectional view in which the disk and the rim are placed in the rim disk assembling device of FIG. 1.

As shown in FIG. 5, the disk 72 is placed so that its hub hole 80 fits over the hub hole fitting member 28. At this time, as for the disk 72, the designed surface of its hub attachment portion 81 is supported with the top surface of the disk center supporting member 22, while an area of the rim 71 to be joined to the joint opening circumferential end 74 is supported from the designed surface, from under, with the disk supporting member 23. The disk 72 is radially positioned as the hub hole fitting member 28 fits into the hub hole 80 so that the center of the disk 72 coincides with the center axis X. Next, the rim 71 is placed on the disk 72 to bring it to a radial position for roughly joining.

Figure 6:
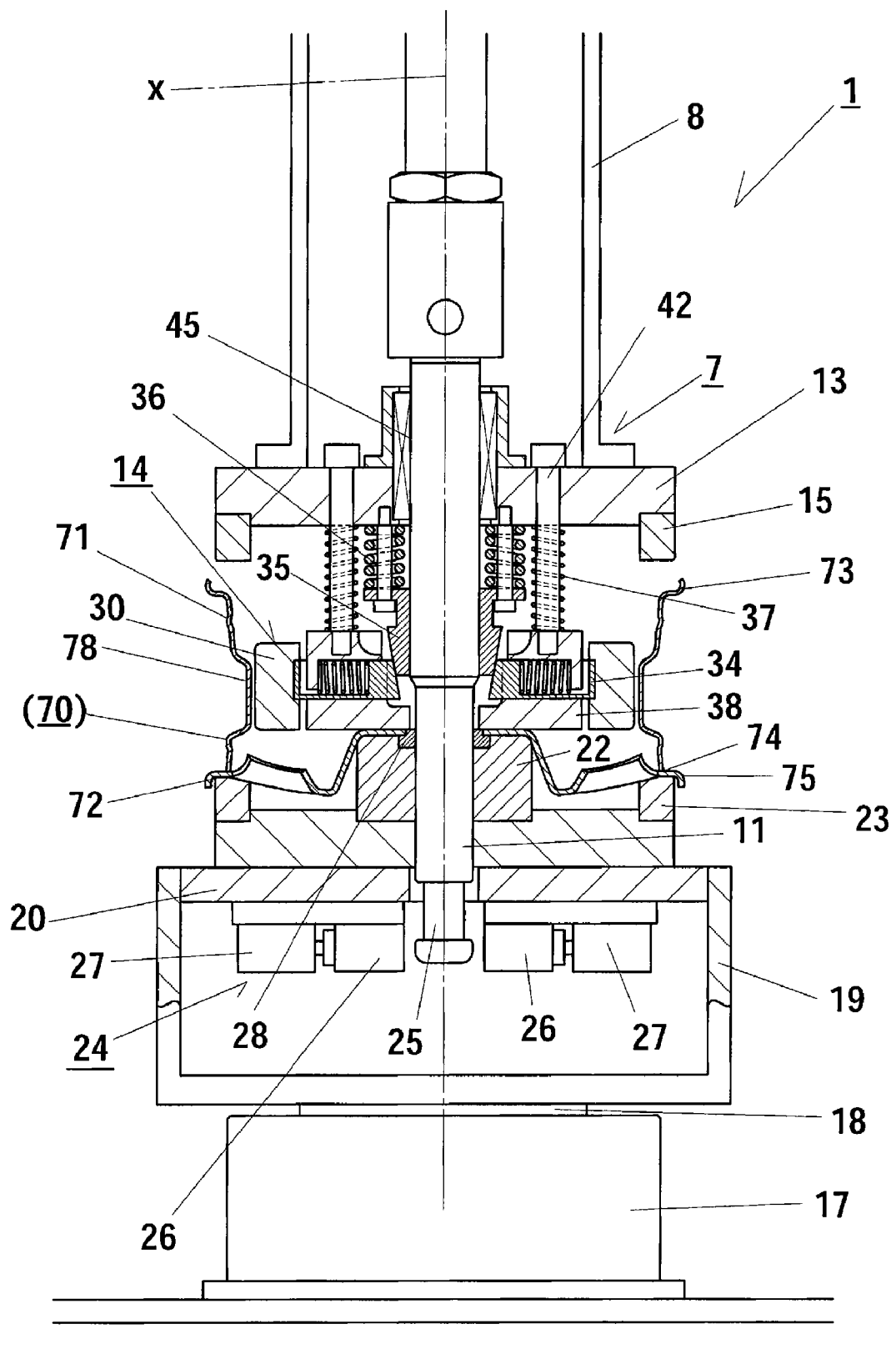
FIG. 6 is a sectional view in which a vertical motion rotary unit is being lowered with a vertical driving device.

Then, the vertical driving device 3 is operated to lower the vertical motion frame 5 and the vertical motion rotary unit 7 as a whole. Along with the lowering motion of the vertical motion rotary unit 7, the centering rod 11 goes into the holes bored in the center of the hub hole fitting member 28 and the disk center supporting member 22. Further, as for the radial restraining members 14 as shown in FIG. 6, its downward motion stops when the bottom surface of its holding case 38 comes into contact with the back surface of the hub attachment portion 81 of the disk 72. In this stop position, the contacting members 30 of the pressing members 34 of the radial restraining members 14 are in about the same height position as the inside circumferential surface of the rim drop portion 78.

Figure 7:
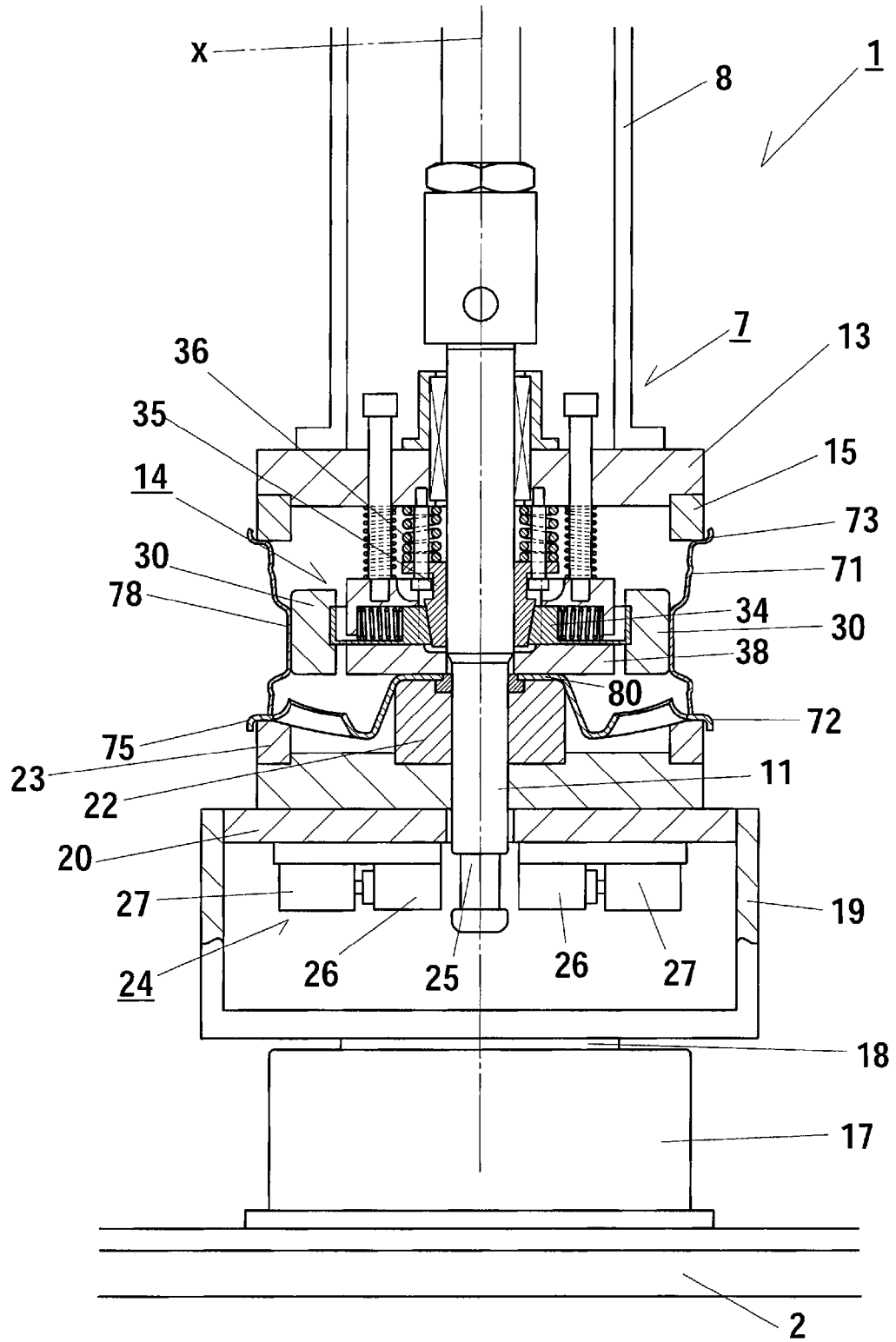
FIG. 7 is a sectional view of a state, following the stat of FIG. 6, in which the vertical motion rotary unit is in a lowered position.

Also after that, the vertical driving device 3 continues operation and components excluding the radial restraining members 14 of the vertical motion rotary unit 7 lower. As a result, as described above, the holding springs 37 of the radial restraining members 14 are elastically compressed, and the vertical distance between the radial restraining members 14 and the lowering vertical motion table 13 continues to decrease (See FIGS. 6 and 7). Along with the lowering of the vertical motion table 13, the conversion guide member 35 also lowers, the guiding faces 43 of the conversion guide member 35 comes into contact with the pressed portions 44 of the pressing members 34 of the radial restraining members 14. Here, as described above, the spring constant of the holding spring 37 of the radial restraining member 14 is set to be lower than that of the guide spring 36 of the conversion guide member 35, so that the guide spring 36 is harder to be elastically compressed. Therefore, along with the lowering of the vertical motion table 13, the pressed portions 44 of the pressing members 34 move radially outward along the guiding face 43 of the conversion guide member 35. This results in that the holding springs 37 of the radial restraining members 14 are further compressed. In other words, the conversion guide member 35 lowers relative to the radial restraining members 14. Then, the pressing members 34 moving radially outward relative to the holding case 38 causes their contacting members 30 to contact the inside circumferential surface of the rim drop portion 78 (See FIG. 7). Such radial restraining members 14 as described before are provided in four positions at about constant circumferential angular intervals, so that the contacting members 30 of the pressing members 34 nearly evenly contact the rim drop portion 78 to restrain the rim drop portion 78. Thus, the rim 71 is radially positioned with its center coinciding with the center axis X. As the pressing members 34 are further urged radially outward, the pressing members 30 are pressed against the inside circumferential surface of the rim drop portion 78, so that the radial position is maintained. Incidentally, the pressing springs 33 installed in the spring grooves 40 of the pressing members 34 are elastically compressed according to the radial outward motion of the pressing members 34.

On the other hand, according to the lowering of the vertical motion rotary unit 7, the rim supporting member 15 provided on the underside of the vertical motion table 13 contacts from above the rim flange portion 73. The centering rod 11 passes through the rod insertion hole 21 of the rotary table 20, and the clamp portion 25 of the centering rod 11 projects below from the rotary table 20. As the rim supporting member 15 presses the rim flange portion 73 with a specified pressing force, the vertical driving device 3 stops operation (See FIG. 7). Here, it is adapted that the contacting members 30 of the pressing members 34 are made to contact the rim drop portion 78 in the state in which the rim supporting member 15 comes in contact with the rim flange portion 73. This results in that, as the vertical motion rotary unit 7 further lowers, the rim supporting member 15 presses the radially positioned rim 71, while the pressing members 34 maintain the radial positioning.

Incidentally, in the present arrangement, the pressing force working from the rim supporting member 15 onto the rim 71 also works through the rotary table 20 onto the direct drive motor 17. However, this pressing force is of such an amount the radial restraining members 14 exert for radially positioning the rim 71, and is smaller enough than the squeezing force for squeezing the rim 71 and the disk 72 after the positioning. Therefore, the pressing force working on the direct drive motor 17 is very small, of the extent that does not affect the operation of the direct drive motor 17, and so raises no problem.

After the operation of the vertical driving device 3 is stopped as described above (See FIG. 7), the gripping arms 26, 26 are radially extended by operating the air cylinders 27, 27 of the rod connecting device 24. Next, as shown in FIG. 3, the gripping arms 26, 26 grip the radially opposite sides of the clamp portion 25 of the centering rod 11 projecting down below the rotary table 20 to interconnect the centering rod 11 and the rotary table 20. Thus, the centering rod 11 and the rotary table 20 can move as a single body.

After that, the rod pulling device 12 is operated to pull up the centering rod 11 while operating again the vertical driving device 3 so that the rim supporting member 15 depresses the rim flange portion 73. Here, since the centering rod 11 is connected to the rotary table 20 as described above, the rotary table 20 is also pulled up. As a result, the disk supporting member 23 located on the rotary table 20 pushes up the joint area of the disk 72. The hub attachment portion 81 of the disk 72 is also pushed up with the disk center supporting member 22.

Here, as the pulling force by the operation of the rod pulling device 12 and the pressing force by the operation of the vertical driving device 3 are made about the same each other, both the forces are almost entirely used to sandwich the disk 72 and the rim 71. This means that no load due to the squeezing works on the rotary frame 19 and the direct drive motor 17.

As described above, the rim supporting member 15 depresses the rim flange portion 73 while the disk supporting member 23 pushes up the joint area of the disk 72, so that the rim 71 and the disk 72 radially positioned respectively with high accuracy are sandwiched from above and under along the center axis X. Here, the squeezing forces on the rim 71 and the disk 72 work directly on the area where the rim 71 and the disk 72 are joined together. Besides, as the rim 71 is radially restrained along the rim drop portion 78 with the radial restraining members 14, its radial deformation is restricted, which helps the squeezing forces work suitably on the joint area.

As described above, the downward and upward forces required to sandwich the rim 71 and the disk 72 do not work on the direct drive motor 17 for rotating the rotary table 20. Therefore, it is possible to further increase the depressing force produced with the vertical driving device 3 and the upward force produced with the rod pulling device 12 to further increase the squeezing forces for pressing together the rim 71 and the disk 72. As a result, the rim 71 and the disk 72 are brought into pressed contact state with greater squeezing forces. Here, the depressing force and the upward force are set so that the squeezing forces are great enough to completely restrict thermal deformation caused by the weld heat during welding which will be described later.

Then, after radially positioning the rim 71 and the disk 72 respectively with high accuracy and bringing them into pressed contact state with great forces as described above, they are joined together by arc welding. That is to say, by operating the air cylinder 52 of the welding device 50, the welding torch 51 is extended and stopped at a position where welding of the rim 71 and the disk 72 is possible (See FIG. 2). When the direct drive motor 17 is operated at a specified revolution to rotate the rotary table 20, the torch 51 synchronously starts arc welding. As a result, the rim 71 and the disk 72 in pressed contact state are welded together over the circumferential direction. Incidentally here, along with the rotation of the rotary table 20, the entire vertical motion rotary unit 7 rotates relative to the vertical motion frame 5. When the rotary table 20 makes about one turn relative to the welding torch 51, operation of the direct drive motor 17 is stopped and also welding operation with the welding torch 51 is stopped. Since the rim 71 and the disk 72 are maintained during the welding in pressed contact state with great squeezing forces as described above, thermal deformation due to weld heat can be almost perfectly restricted. Besides, since the rotary table 20 is rotated directly with the direct drive motor 17, no backlash is present, great torque is produced stably under control, so that the rotary table 20 is rotated smoothly and evenly. Therefore, weld quality of the rim 71 and the disk 72 is improved and stabilized.

After the welding with the welding device 50 as described above, the welding torch 51 is retracted. Then the pulling action with the rod pulling device 12 is stopped, and the load is removed. As a result, the squeezing forces acting on the disk 72 and the rim 71 are released. Further, the gripping arms 26, 26 of the rod connecting device 24 are retracted to release the connected state between the centering rod 11 and the rotary table 20. After that, the vertical driving device 3 is operated to raise the vertical motion frame 5 and to raise the vertical motion rotary unit 7. Here, along with the rise of the vertical motion table 13, the holding springs 37 of the radial restraining members 14 elastically expand, so that the distance to the vertical motion table 13 increases. Since the conversion guide member 35 also rises, elastic compression of the pressing springs 33 is gradually released, so that the pressing members 34 move radially inward. As a result, the contacting members 30 of the pressing members 34 move off the inside circumferential surface of the rim drop portion 78 to release restraint on the rim drop portion 78 with the radial restraining members 14.

Along with further rise of the vertical motion rotary unit 7, when the maximum motion length of the stripper bolt 42 is reached, the radial restraining members 14 rise together with the vertical motion table 13. Thus, the entire vertical motion rotary unit 7 rises and stops (See FIG. 4). After that, the vehicle full face wheel 70 made by welding together the disk 72 and the rim 71 present on the rotary table 20 is taken out to finish the assembling and welding process.

With the rim disk assembling device 1 for the vehicle full face wheel according to this embodiment described above, the vehicle full face wheel 70 is manufactured, with the wheel 70 formed of the disk 72 and the rim 71 fillet-welded together while their centers being coaxial with each other with high accuracy and thermal deformation due to weld heat being restricted. Further, it is possible to enhance and stabilize the weld quality. Such a vehicle full face wheel 70 is a product exhibiting high anti-wobble accuracy, excellent vibration characteristic, and low noise characteristic.

The rim disk assembling device according to any one of the embodiments of the present invention can find particular utility in any number of different applications.

For example, the rim disk assembling device for a vehicle full face wheel according to the invention is a device in which a disk, placed on a rotary table rotated with a rotary device and radially positioned with a hub hole fitting member, and a rim, placed on the disk and radially positioned with its rim drop portion restrained with a rim position restraining means, are brought into pressed contact state by squeezing them with a disk supporting member and a rim supporting member by pulling up a centering rod connected through a rod connecting means to the rotary table while depressing the rim flange portion with the rim supporting member. Therefore, the device provides the following effects.

a. Since no load works on the rotating means for rotating the rotary table or on the supporting member for supporting the rotary table, when the disk and the rim are brought into pressed contact state by squeezing them, it is possible to rotate the rotary table stably and carry out uniform, accurate welding.

b. Since no load works on the rotating means, it is possible to bring the disk and the rim into pressed contact state with great squeezing forces that can sufficiently restrict thermal deformation occurring during the welding process.

c. Since the rim drop portion, generally formed with highest accuracy, is restrained, the rim is radially positioned with high accuracy.

d. Since the disk and the rim are sandwiched from just above and under the joint area of the disk and the rim, the squeezing forces work directly on the joint area, and strongly pressed contact state is produced efficiently and suitably.

e. In comparison with the rim disk assembling device of conventional constitution described above, it is possible to manufacture vehicle full face wheels having high anti-wobble accuracy and exhibiting excellent, low vibration and low noise characteristics.

In addition, with the rim disk assembling device in which the rod connecting means brings the rotary table and the centering rod into connected state permitting concerted motion by gripping the clamp portion of the centering rod passed through the rod insertion hole of the rotary table with the rod gripping device disposed on the underside of the rotary table, since the rotary table may be pulled up parallel along its center axis by the centering rod pulled into action, it is possible to pull up the disk supporting members evenly along the circumference and sandwich the rim and the disk evenly along the circumference.

Moreover, with the rim disk assembling device including the vertical motion rotary unit on which the rod pulling device for pulling the centering rod into action, the rim supporting member, and the rim position restraining means are mounted; and the vertical motion frame connected to the vertical motion rotary unit for rotation and concerted vertical motion and to the vertical driving device for drive-causing the vertical motion, in which the vertical motion rotary unit is rotated together with the rotary table when the disk and the rim are brought into pressed contact state, it is possible as described above to bring the disk and the rim into pressed contact state with high accuracy by great squeezing forces to exhibit suitably and easily the function and effect of the invention for stably rotating these components, and improve and stabilize the weld quality.

In addition, with the rim disk assembling device in which the vertical motion rotary unit has the rim supporting member and the rim position restraining means mounted on its underside, the rod pulling device disposed in its upper part, and the vertical motion table with the rod passage hole formed in its center for the centering rod to be inserted into to be vertically movable, the vertical motion rotary unit as a whole is capable of performing accurately and easily vertical motion as driven by the vertical driving device and rotary motion together with the rotary table. This makes it possible to further suitably exhibit function and effect of the above-described invention.

Also, with the rim disk assembling device in which the rim position restraining means is adapted to press the contact portions of the pressing members of the radial restraining members disposed at about constant circumferential angular intervals against the inside circumferential surface of the rim drop portion in the state in which the rim supporting member contacts from above the rim flange portion as the pressed portions of the pressing members contact the conversion guide member along with the downward motion of the vertical motion table and thereby the pressing members move radially outward, it is possible to radially position the rim with high accuracy and maintain the positioning until welding of together the rim and the disk is over and to further enhance and stabilize the weld quality. Further, since it is constituted with a relatively simple mechanism, the rim restraining action is carried out stably. Besides, maintenance and replacement may also be made easily.

Further, with the rim disk assembling device in which the rotating means is the rotating device with the rotary shaft disposed below the rotary table along the center shaft to rotate the rotary table, since the rotating device may be connected directly to the rotary table without a speed reduction mechanism or gears interposed in between, it is possible to rotate the rotary table about the center axis stably, to weld the disk and the rim in pressed contact state all the more evenly along the circumferential direction, and to further improve the weld quality.

In addition, with the rim disk assembling device in which the rotating device is the direct drive motor, it is possible to rotate the rotary table for rotating the disk and the rim brought into pressed contact state with strong squeezing forces stably, accurately, and smoothly from start to stop of the rotation.

The invention claimed is:

1. A rim disk assembling device for a vehicle full face wheel, comprising:
   a centering rod moving up and down along a center axis of a full face wheel;
   a rotary table rotated about the center axis by a rotating means;
   a hub hole fitting member disposed on the rotary table to radially position a disk by fitting to the hub hole of the disk;
   a disk supporting member disposed on the rotary table to support the disk from a designed surface side of the area joined to a rim;
   a rim supporting member moving down along the center axis together with the centering rod to support the rim disposed on the disk supported with the hub hole fitting member and the disk supporting member by pressing from above its rim flange portion;
   a rim position restraining means for radially positioning the rim by radially restraining an inside circumferential surface of a rim drop portion centered on the centering rod; and
   a rod connecting means for connecting the centering rod that has moved down along the center axis to the rotary table,
   wherein the device is adapted to bring into a pressed contact state the disk radially positioned with the hub hole fitting member and the rim radially positioned with the rim position restraining means by sandwiching them between the disk supporting member and the rim supporting member and by pulling up the centering rod connected through the rod connecting means to the rotary table while pressing down the rim flange portion with the rim supporting member.

2. The rim disk assembling device according to claim 1, wherein the rod connecting means comprises:
   a clamp portion formed at the tip of the centering rod;
   a rod insertion hole formed in a center of the rotary table for the centering rod to be inserted into; and
   a rod gripping device disposed on the underside of the rotary table to grip and fix the clamp portion of the centering rod inserted into the rod insertion hole and projecting from the underside and to bring the rotary table and the centering rod into a connected state in which they can move as a single body.

3. The rim disk assembling device according to claim 1, comprising:
   a vertical motion rotary unit on which a rod pulling device for pulling the centering rod into action, the rim supporting member, and the rim position restraining means are mounted; and
   a vertical motion frame to which the vertical motion rotary unit is connected to be rotatable and movable in a vertical direction as a single body, and connected to a vertical driving device for driving the body in the vertical direction,
   wherein the vertical motion rotary unit rotates as a single body with the rotary table when the disk and the rim are brought into sandwich-pressed contact state by setting the rotary table connected to the centering rod into pulling action by means of the rod pulling device.

4. The rim disk assembling device according to claim 3, wherein the vertical motion rotary unit has:
   the rim supporting member and the rim position restraining means mounted both on its underside;
   a rod pulling device disposed in its upper part; and
   a vertical motion table with a rod passage hole formed in its center for a centering rod to be inserted into to be vertically movable.

5. The rim disk assembling device according to claim 4, wherein the rim position restraining means comprises:
   a plural number of radial restraining members disposed in the vertical motion table at about constant angular intervals around the centering rod, each made up of a holding case, suspended from a vertical motion table, that is urged downward, and is vertically movable; and a pressing member installed in the holding case, and is radially movable, and urged radially inward, with its inside end having a pressed portion, and with its outside end having a contacting portion for contacting the inside circumferential surface of the rim drop portion; and
   a conversion guide member suspended from the vertical motion table to contact the pressed portions of the pressing members along with the downward motion of the vertical motion table, to cause the pressing members to extend radially outward, and to cause the contacting portions of the pressing members to press against the inside circumferential surface of the rim drop portion in the state in which the rim supporting member contacts the rim flange portion from above.

6. The rim disk assembling device according to claim 1, wherein the rotating means is a rotating device with a rotary shaft disposed under the rotary table along the center axis to rotate the rotary table.

7. The rim disk assembling device according to claim 6, wherein the rotating device is a direct drive motor.

8. A rim disk assembling device for a vehicle full face wheel, comprising:
   a centering rod moving up and down along a center axis of a full face wheel;
   a rotary table rotated about the center axis by a rotating means;
   a hub hole fitting member disposed on the rotary table to radially position a disk by fitting to the hub hole of the disk;
   a disk supporting member disposed on the rotary table to support the disk from a designed surface side of the area joined to a rim;
   a rim supporting member moving down along the center axis together with the centering rod to support the rim disposed on the disk supported with the hub hole fitting member and the disk supporting member by pressing from above its rim flange portion;

a rim position restraining means for radially positioning the rim by radially restraining an inside circumferential surface of a rim drop portion centered on the centering rod;

a rod connecting means for connecting the centering rod that has moved down along the center axis to the rotary table, wherein the device is adapted to bring into a pressed contact state the disk radially positioned with the hub hole fitting member and the rim radially positioned with the rim position restraining means by sandwiching them between the disk supporting member and the rim supporting member and by pulling up the centering rod connected through the rod connecting means to the rotary table while pressing down the rim flange portion with the rim supporting member;

wherein the rod connecting means comprises:

a clamp portion formed at the tip of the centering rod;

a rod insertion hole formed in a center of the rotary table for the centering rod to be inserted into; and a rod gripping device disposed on the underside of the rotary table to grip and fix the clamp portion of the centering rod inserted into the rod insertion hole and projecting from the underside and to bring the rotary table and the centering rod into a connected state in which they can move as a single body.

9. A rim disk assembling device for a vehicle full face wheel, comprising:

a centering rod moving up and down along a center axis of a full face wheel;

a rotary table rotated about the center axis by a rotating means;

a hub hole fitting member disposed on the rotary table to radially position a disk by fitting to the hub hole of the disk;

a disk supporting member disposed on the rotary table to support the disk from a designed surface side of the area joined to a rim;

a rim supporting member moving down along the center axis together with the centering rod to support the rim disposed on the disk supported with the hub hole fitting member and the disk supporting member by pressing from above its rim flange portion;

a rim position restraining means for radially positioning the rim by radially restraining an inside circumferential surface of a rim drop portion centered on the centering rod;

a rod connecting means for connecting the centering rod that has moved down along the center axis to the rotary table, wherein the device is adapted to bring into a pressed contact state the disk radially positioned with the hub hole fitting member and the rim radially positioned with the rim position restraining means by sandwiching them between the disk supporting member and the rim supporting member and by pulling up the centering rod connected through the rod connecting means to the rotary table while pressing down the rim flange portion with the rim supporting member;

a vertical motion rotary unit on which a rod pulling device for pulling the centering rod into action, the rim supporting member, and the rim position restraining means are mounted;

a vertical motion frame to which the vertical motion rotary unit is connected to be rotatable and movable in a vertical direction as a single body, and connected to a vertical driving device for driving the body in the vertical direction, wherein the vertical motion rotary unit rotates as a single body with the rotary table when the disk and the rim are brought into sandwich-pressed contact state by setting the rotary table connected to the centering rod into pulling action by means of the rod pulling device;

wherein the vertical motion rotary unit includes:

the rim supporting member and the rim position restraining means mounted both on its underside;

a rod pulling device disposed in its upper part; and a vertical motion table with a rod passage hole formed in its center for a centering rod to be inserted into to be vertically movable, wherein the rim position restraining means comprises:

a plural number of radial restraining members disposed in the vertical motion table at about constant angular intervals around the centering rod, each made up of a holding case, suspended from a vertical motion table, that is urged downward, and is vertically movable; and a pressing member installed in the holding case, and is radially movable, and urged radially inward, with its inside end having a pressed portion, and with its outside end having a contacting portion for contacting the inside circumferential surface of the rim drop portion; and a conversion guide member suspended from the vertical motion table to contact the pressed portions of the pressing members along with the downward motion of the vertical motion table, to cause the pressing members to extend radially outward, and to cause the contacting portions of the pressing members to press against the inside circumferential surface of the rim drop portion in the state in which the rim supporting member contacts the rim flange portion from above.

* * * * *